United States Patent
Kwon et al.

(10) Patent No.: US 9,611,386 B2
(45) Date of Patent: Apr. 4, 2017

(54) TRANSPARENT POLYCARBONATE COMPOSITION AND MOLDED ARTICLE COMPRISING SAME

(71) Applicant: Samsung SDI Co., Ltd., Yongin-si (KR)

(72) Inventors: Kee-Hae Kwon, Uiwang-si (KR);
O-Sung Kwon, Uiwang-si (KR);
In-Chol Kim, Uiwang-si (KR);
Joo-Hyun Jang, Uiwang-si (KR);
Chang-Min Hong, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/889,166

(22) PCT Filed: Jul. 8, 2013

(86) PCT No.: PCT/KR2013/006047
§ 371 (c)(1),
(2) Date: Nov. 5, 2015

(87) PCT Pub. No.: WO2014/181921
PCT Pub. Date: Nov. 13, 2014

(65) Prior Publication Data
US 2016/0083578 A1 Mar. 24, 2016

(30) Foreign Application Priority Data
May 6, 2013 (KR) .................. 10-2013-0050824

(51) Int. Cl.
| C08L 69/00 | (2006.01) |
| C08L 33/12 | (2006.01) |
| C08L 33/10 | (2006.01) |
| C08L 33/06 | (2006.01) |
| C08L 33/04 | (2006.01) |

(52) U.S. Cl.
CPC .............. *C08L 69/00* (2013.01); *C08L 33/06* (2013.01); *C08L 33/10* (2013.01); *C08L 33/12* (2013.01); *C08L 33/04* (2013.01); *C08L 2201/10* (2013.01)

(58) Field of Classification Search
None
See application file for complete search history.

(56) References Cited

U.S. PATENT DOCUMENTS

| 4,746,721 A | 5/1988 | Ueno et al. |
| 4,997,883 A | 3/1991 | Fischer et al. |
| 5,166,270 A | 11/1992 | Hungenberg et al. |
| 5,401,826 A | 3/1995 | Sakashita et al. |
| 6,391,418 B1 | 5/2002 | Ueda et al. |
| 7,354,980 B1 | 4/2008 | Mentak |
| 7,514,523 B2 | 4/2009 | Chen et al. |
| 7,816,444 B2 | 10/2010 | Kamps et al. |
| 8,221,886 B2 | 7/2012 | Kogure |
| 8,304,494 B2 | 11/2012 | Park et al. |
| 8,440,760 B2 | 5/2013 | Kim et al. |
| 8,541,506 B2 | 9/2013 | Kwon et al. |
| 8,642,693 B2 | 2/2014 | Kim et al. |
| 8,642,699 B2 | 2/2014 | Matsuoka et al. |
| 8,772,401 B2 | 7/2014 | Kwon et al. |
| 8,901,218 B2 | 12/2014 | Kim et al. |
| 8,940,836 B2 | 1/2015 | Kwon et al. |
| 9,127,157 B2 | 9/2015 | Chung et al. |
| 9,340,670 B2 | 5/2016 | Chung et al. |
| 2004/0013882 A1 | 1/2004 | Gorny et al. |
| 2004/0147655 A1 | 7/2004 | Sawaki et al. |
| 2007/0072995 A1 | 3/2007 | Kang et al. |
| 2008/0132614 A1 | 6/2008 | Jung et al. |
| 2008/0154008 A1 | 6/2008 | Jeong et al. |
| 2010/0113697 A1 | 5/2010 | Lee et al. |
| 2010/0152357 A1 | 6/2010 | Kwon et al. |
| 2010/0197850 A1 | 8/2010 | Kim |
| 2010/0256288 A1 | 10/2010 | Kim et al. |
| 2011/0245388 A1 | 10/2011 | Monden |
| 2014/0371344 A1 | 12/2014 | Chung et al. |
| 2014/0371375 A1* | 12/2014 | Chung .................. C08L 33/10 524/502 |
| 2015/0094444 A1 | 4/2015 | Chi et al. |

FOREIGN PATENT DOCUMENTS

| CN | 101747610 A | 6/2010 |
| CN | 101768347 A | 7/2010 |
| CN | 101827872 A | 9/2010 |

(Continued)

OTHER PUBLICATIONS

International Search Report in counterpart International Application No. PCT/KR2013/006047 dated Jan. 28, 2014, pp. 1-4.
International Search Report in commonly owned International Application No. PCT/KR2011/009958 dated Oct. 29, 2012, pp. 1-4.
International Search Report in commonly owned International Application No. PCT/KR2012/010470 dated Feb. 19, 2013, pp. 1-2.
International Search Report in commonly owned International Application No. PCT/KR2011/010333 dated Nov. 23, 2012, pp. 1-4.
Search Report in commonly owned European Application No. 12860942.7 dated Jul. 23, 2015, pp. 1-5.

(Continued)

*Primary Examiner* — David Buttner
(74) *Attorney, Agent, or Firm* — Additon, Higgins & Pendleton, P.A.

(57) ABSTRACT

Provided is a transparent polycarbonate composition that includes: (A) 5 to 95 wt % of biphenyl modified polycarbonate including a repeating unit represented by Chemical Formula 1, a repeating unit represented by Chemical Formula 2, and a repeating unit represented by Chemical Formula 3; and (B) 1 to 50 wt % of an acrylate-based copolymer including (B-1) a repeating unit derived from aromatic (meth)acrylate having a refractive index of 1.58 to 1.70 and (B-2) a repeating unit derived from a monofunctional unsaturated monomer.

15 Claims, No Drawings

(56) References Cited

FOREIGN PATENT DOCUMENTS

| | | |
|---|---|---|
| CN | 102007183 A | 4/2011 |
| CN | 102115585 A | 7/2011 |
| JP | 03-124764 A | 5/1991 |
| JP | 05-339390 A | 12/1993 |
| JP | 06-248066 A | 9/1994 |
| JP | 07-199488 A | 8/1995 |
| JP | 2001-049072 A | 2/2001 |
| JP | 2006-199732 A | 8/2006 |
| JP | 2006-313089 A | 11/2006 |
| JP | 2011-012211 A | 1/2011 |
| KR | 10-0504967 B1 | 7/2005 |
| KR | 10-0511423 | 8/2005 |
| KR | 10-0665806 B1 | 1/2007 |
| KR | 10-2007-0071446 A | 7/2007 |
| KR | 10-2008-0082968 | 9/2008 |
| KR | 10-2009-0017799 A | 2/2009 |
| KR | 10-0885819 B1 | 2/2009 |
| KR | 10-2009-0026359 A | 3/2009 |
| KR | 10-2009-0039612 A | 4/2009 |
| KR | 10-2009-0066204 | 6/2009 |
| KR | 10-2009-0066204 A | 6/2009 |
| KR | 10-2010-0022376 A | 3/2010 |
| KR | 10-2010-0050778 A | 5/2010 |
| KR | 10-2010-0069889 A | 6/2010 |
| KR | 10-2012-0049963 | 5/2012 |
| KR | 10-2012-0066446 | 6/2012 |
| KR | 10-2013-0056127 | 5/2013 |
| KR | 10-2013-0070415 | 6/2013 |
| KR | 10-2013-0071265 | 6/2013 |
| TW | 200936688 A | 9/2009 |
| WO | 2009/113573 A1 | 9/2009 |
| WO | 2009/128601 A1 | 10/2009 |
| WO | 2013/077490 A1 | 5/2013 |
| WO | 2014/181921 A1 | 11/2014 |

OTHER PUBLICATIONS

Office Action in commonly owned U.S. Appl. No. 14/365,991 mailed Jun. 26, 2015, pp. 1-11.

Office Action in commonly owned U.S. Appl. No. 14/365,991 mailed Nov. 13, 2015, pp. 1-9.

* cited by examiner

TRANSPARENT POLYCARBONATE COMPOSITION AND MOLDED ARTICLE COMPRISING SAME

CROSS-REFERENCE TO RELATED APPLICATIONS

This application claims priority to and the benefit of International Application No. PCT/KR2013/006047, filed Jul. 8, 2013, which published as WO 2014/181921 on Nov. 13, 2014, and Korean Patent Application No. 10-2013-0050824, filed in the Korean Intellectual Property Office on May 6, 2013, the entire disclosure of each of which is incorporated herein by reference.

TECHNICAL FIELD

A transparent polycarbonate composition and a molded article including the same are disclosed.

BACKGROUND ART

A thermoplastic resin has lower specific gravity than glass or metal and improved formability and impact resistance. Recently, a plastic material made from the thermoplastic resin has replaced a glass or metal material in accordance with enlarging or weight-lightening of electric/electronic products in order to reduce a cost, and applicably spread up to an auto part area. As a result, a molded article manufactured from the thermoplastic resin increasingly has required high impact resistance and scratch resistance.

An acryl-based resin such as a polymethylmethacrylate (PMMA) resin has improved transparency, weather resistance, mechanical strength, surface gloss, adherence, and the like, particularly, much excellent scratch resistance but insufficient impact resistance. In order to improve impact resistance of the PMMA resin, an acryl-based impact-reinforcing agent having a similar refractive index thereto may be added thereto, but a rubber component that is present in the impact-reinforcing agent may deteriorate heat resistance and mechanical properties and rarely secure flame retardancy.

A polycarbonate (PC) resin has satisfactory transparency and impact resistance, and mechanical properties and excellent flame retardancy and thus may be widely applied to an electric/electronic part and an auto interior/exterior material but insufficient scratch resistance. In order to improve scratch resistance of the PC, a modified polycarbonate copolymer may be applied thereto, but since a highly brittle comonomer should be increasingly added to increase scratch resistance, impact resistance may be inevitably deteriorated.

DISCLOSURE

Technical Problem

On the other hand, in order to accomplish both excellent scratch resistance of the PMMA and excellent impact resistance of the PC, an attempt to manufacture a PC/PMMA resin alloy including the polycarbonate resin and the acryl-based resin has been made, but the PC/PMMA resin alloy fails to obtain satisfactory impact resistance and scratch resistance and has a problem of sharply deteriorated transparency and rarely secures fast coloring due to refractive index and compatibility differences between PC and PMMA during the alloying.

Technical Object

One embodiment provides a transparent polycarbonate composition having high level impact strength and scratch resistance simultaneously. Another embodiment provides a molded article including the transparent polycarbonate composition.

Technical Solving Method

In one embodiment, a transparent polycarbonate composition includes (A) 5 to 95 wt % of biphenyl modified polycarbonate including a repeating unit represented by Chemical Formula 1, a repeating unit represented by Chemical Formula 2, and a repeating unit represented by Chemical Formula 3;

[Chemical Formula 1]

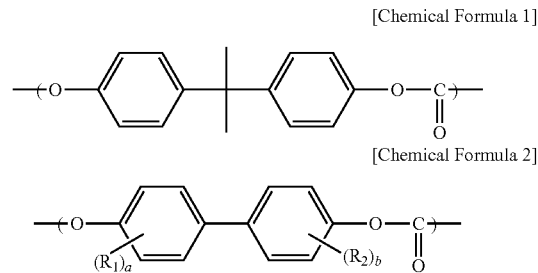

[Chemical Formula 2]

(wherein, $R_1$ and $R_2$ are each independently a substituted or unsubstituted C1 to C6 alkyl group, and a and b are each independently an integer of 0 to 4)

[Chemical Formula 3]

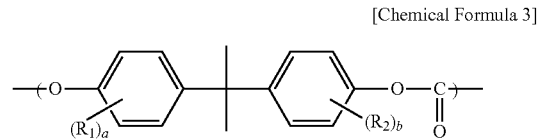

(wherein, $R_1$ and $R_2$ are each independently a substituted or unsubstituted C1 to C6 alkyl group, and a and b are each independently an integer of 1 to 4); and (B) 1 to 50 wt % of a biphenyl or terphenyl modified (meth)acrylate-based copolymer including (B-1) a repeating unit derived from aromatic (meth)acrylate having a refractive index of 1.58 to 1.70 and (B-2) a repeating unit derived from a mono-functional unsaturated monomer.

In the (A) biphenyl modified polycarbonate, a ratio (M1:M2:M3) of the repeating unit represented by Chemical Formula 1 (M1), the repeating unit represented by Chemical Formula 2 (M2) and the repeating unit represented by Chemical Formula 3 (M3) may be 10 to 85 mol %:5 to 30 mol %:10 to 80 mol %.

The (A) biphenyl modified polycarbonate may have a weight average molecular weight of 20,000 to 40,000 g/mol.

The transparent polycarbonate composition may further include 90 wt % or less of (C) a bisphenol A-based polycarbonate prepared from reaction of 2,2-bis-(4-hydroxyphenyl)-propane (hereinafter, bisphenol A) and a compound selected from phosgene, halogen formate, dialkyl carbonate, diaryl carbonate, and a combination thereof. In this case, based on the sum of the (A) biphenyl modified polycarbonate and the (C) bisphenol A-based polycarbonate, the repeating unit represented by Chemical Formula 2 (M2) may be present in a ratio of 5 to 30 mol %, and the repeating unit represented by Chemical Formula 3 (M3) may be present in a ratio of 10 to 80 mol %.

The (B) biphenyl or terphenyl modified (meth)acrylate-based copolymer may be a copolymer of 1 to 50 wt % of the (B-1) aromatic (meth)acrylate having a refractive index of 1.58 to 1.70; and 50 to 99 wt % of the (B-2) mono-functional unsaturated monomer.

The (B-1) aromatic (meth)acrylate having a refractive index of 1.58 to 1.70 may be represented by Chemical Formula 4.

[Chemical Formula 4]

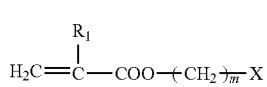

Herein, $R_1$ is hydrogen or a methyl group, m is an integer of 0 to 10, X is an orthobiphenyl group, a metabiphenyl group, a parabiphenyl group, a 2,6-terphenyl group, an orthoterphenyl group, a metaterphenyl group, or a paraterphenyl group.

The (B-2) mono-functional unsaturated monomer may include at least one selected from the group consisting of C1 to C8 alkyl(meth)acrylate; unsaturated carboxylic acid; acid anhydride; C1 to C8 hydroxy alkyl(meth)acrylate; N-alkyl (meth)acrylamide; (meth)acrylamide; a vinyl cyanide monomer; allyl glycidyl ether; glycidyl(meth)acrylate; and an aromatic vinyl monomer.

The (B) biphenyl or terphenyl modified (meth)acrylate-based copolymer may be a copolymer of a mixture that further includes 0 to 49 wt % of (B-3) an alicyclic or aromatic (meth)acrylate having a refractive index of 1.490 to 1.579 and represented by Chemical Formula 5 or Chemical Formula 6:

[Chemical Formula 5]

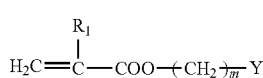

wherein, $R_1$ is hydrogen or a methyl group, m is an integer of 0 to 10, and Y is selected from a cyclohexyl group, a phenyl group, a methylphenyl group, a methylethylphenyl group, a methoxyphenyl group, a propylphenyl group, a cyclohexylphenyl group, a chlorophenyl group, a bromophenyl group, and a benzylphenyl group;

[Chemical Formula 6]

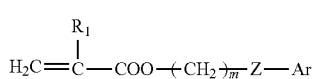

wherein, $R_1$ is hydrogen or a methyl group, m is an integer of 0 to 10, Z is oxygen (O) or sulfur (S), and Ar is selected from a cyclohexyl group, a phenyl group, a methylphenyl group, a methylethylphenyl group, a methoxyphenyl group, a cyclohexylphenyl group, a chlorophenyl group, a bromophenyl group, and a benzylphenyl group.

The (B) biphenyl or terphenyl modified (meth)acrylate-based copolymer may have a weight average molecular weight of 3,000 to 150,000 g/mol.

The (B) biphenyl or terphenyl modified (meth)acrylate-based copolymer may have a refractive index of 1.495 to 1.640.

In another embodiment of the present invention, a molded article using the transparent polycarbonate resin composition is provided.

The molded article may have pencil hardness of F to 2H when measured in a JIS K 5401 evaluation method and a scratch width in a range of 295 to 230 μm when measured in a BSP evaluation method. In addition, the molded article may have a ⅛"-thick Izod impact strength in a range of 3 to 12 kgf·cm/cm when measured in an ASTM D256 evaluation method. On the other hand, the molded article may have haze at a thickness of 2.5 mm in a range of 0.1 to 3.0% when measured in an ASTM D1003 evaluation method.

Advantageous Effect

The transparent polycarbonate resin composition may provide a molded article having high scratch resistance and impact resistance and simultaneously, remarkably improved transparency.

MODE FOR INVENTION

Hereinafter, embodiments of the present invention are described in detail. However, these embodiments are exemplary, and this disclosure is not limited thereto.

In the present specification, when specific definition is not otherwise provided, "(meth)acrylate" refers to acrylate or methacrylate, "(meth)acrylic acid" refers to acrylic acid or methacrylic acid, and "(meth)acrylamide" refers to acrylamide or methacrylamide.

In the present specification, when specific definition is not otherwise provided, "alkyl" refers to a C1 to C30 alkyl group, and specifically a C1 to C20 alkyl group, and "aryl" refers to C6 to C20 aryl.

In one embodiment, a transparent polycarbonate composition includes (A) 5 to 95 wt % of biphenyl modified polycarbonate including a repeating unit represented by Chemical Formula 1, a repeating unit represented by Chemical Formula 2, and a repeating unit represented by Chemical Formula 3;

[Chemical Formula 1]

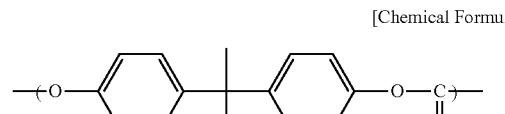

[Chemical Formula 2]

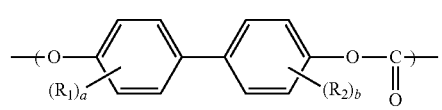

(wherein, $R_1$ and $R_2$ are each independently a substituted or unsubstituted C1 to C6 alkyl group, and a and b are each independently an integer of 0 to 4)

[Chemical Formula 3]

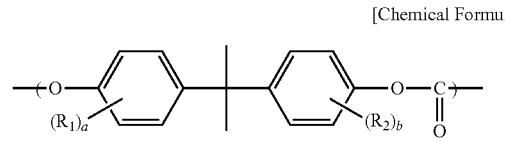

(wherein, $R_1$ and $R_2$ are each independently a substituted or unsubstituted C1 to C6 alkyl group, and a and b are each independently an integer of 1 to 4); and (B) 1 to 50 wt % of a biphenyl or terphenyl modified (meth)acrylate-based copolymer including (B-1) a repeating unit derived from aromatic (meth)acrylate having a refractive index of 1.58 to 1.70 and (B-2) a repeating unit derived from a mono-functional unsaturated monomer; and (C) 0 to 90 wt % of bisphenol A-based polycarbonate 2,2-bis-(4-hydroxyphenyl)-propane (bisphenol A) prepared from reaction of 2,2-bis-(4-hydroxyphenyl)-propane (hereinafter, bisphenol A) and a compound selected from phosgene, halogen formate, dialkyl carbonate, diaryl carbonate, and a combination thereof.

The transparent polycarbonate composition includes a biphenyl or terphenyl modified (meth)acrylate copolymer along with biphenyl modified polycarbonate, and accordingly, a molded article manufactured therefrom simultaneously shows high impact strength and excellent scratch resistance and also, remarkably improved properties such as transparency, and haze. Hereinafter, each component of the composition is specifically described.

(A) Biphenyl Modified Polycarbonate

In the transparent polycarbonate composition, the biphenyl modified polycarbonate may be prepared from a reaction (e.g., condensation reaction or ester exchange reaction) between a diol mixture including 2,2-bis(4-hydroxyphenyl)propane (bisphenol A), biphenyl diol of Chemical Formula 2-1, and dialkyl bisphenol A of Chemical Formula 3-1 and a compound selected from the group consisting of phosgene, halogen formate, diaryl carbonate, dialkyl carbonate, and a combination thereof:

[Chemical Formula 2-1]

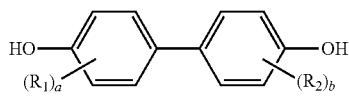

In Chemical Formula 2-1, $R_1$ and $R_2$, a and b are the same as defined in Chemical Formula 2.

[Chemical Formula 3-1]

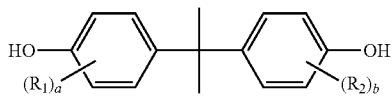

In Chemical Formula 3-1, $R_1$ and $R_2$, a and b are the same as defined in Chemical Formula 3.

The bisphenol A may be used in an amount of 10 to 85 mol %, specifically, 20 to 70 mol %, and more specifically 20 to 60 mol %. Within the ranges, the prepared polycarbonate has improved mechanical properties such as Izod impact strength.

Specific examples of the biphenyl diol of Chemical Formula 2-1 may be 4,4'-biphenol, 2,2'-dimethyl 4,4'-biphenyldiol, 3,3'-dimethyl 4,4'-dihydroxy biphenyl, 2,2',6,6',-tetramethyl-4,4'-biphenol, and the like, but are not limited thereto. 4,4'-biphenol is preferable. The biphenyl diol of Chemical Formula 2-1 may be used in an amount of 5 to 30 mol %, preferably 10 to 30 mol %, and more preferably 10 to 25 mol %. Within the ranges, the prepared polycarbonate has improved resistance against a solvent.

Specific examples of the dialkyl bisphenol A represented by Chemical Formula 3-1 may be 2,2-bis-(3,5-dimethyl-4-hydroxyphenyl)-propane, 2,2-bis-(3,5-diethyl-4-hydroxyphenyl)-propane, 2,2-bis-(3,5-diisopropyl-4-hydroxyphenyl)-propane, 2,2-bis-(3,5-dibutyl-4-hydroxyphenyl)-propane, and the like, but are not limited thereto. 2,2-bis-(3,5-dimethyl-4-hydroxyphenyl)-propane may be preferably used. The dialkyl bisphenol A may be used in an amount of 10 to 80 mol %, preferably 20 to 70 mol %, and more preferably 30 to 70 mol %. When the dialkyl bisphenol A is used within the range, the prepared polycarbonate may have excellent scratch resistance characteristics of pencil hardness of greater than or equal to F.

In the (A) biphenyl modified polycarbonate prepared in this way, a ratio (M1:M2:M3) of the repeating unit represented by Chemical Formula 1 (M1), the repeating unit represented by Chemical Formula 2 (M2) and the repeating unit represented by Chemical Formula 3 (M3) may be 10 to 85 mol %:5 to 30 mol %:10 to 80 mol %, specifically, 20 to 70 mol %:10 to 30 mol %:20 to 70 mol %, and more specifically, 20 to 60 mol %:10 to 25 mol %:30 to 70 mol %. When used within the above range, property balance of impact resistance, scratch resistance, chemical resistance, and liquidity may be obtained.

The (A) biphenyl modified polycarbonate may have a weight average molecular weight of 20,000 to 40,000 g/mol. When the molecular weight is within the range, a molded article having excellent formability as well as excellent scratch resistance and impact resistance may be provided.

As the diaryl carbonate or dialkyl carbonate, any known compound for preparing polycarbonate may be used. Specific examples of the diaryl carbonate or dialkyl carbonate may be diphenyl carbonate, ditolyl carbonate, bis(chlorophenyl)carbonate, m-cresyl carbonate, dinaphthyl carbonate, bis(diphenyl)carbonate, diethyl carbonate, dimethyl carbonate, dibutyl carbonate, dicyclohexyl carbonate, and the like, but are not limited thereto. They may be used singularly or in a combination of two or more. Preferably, in an exemplary embodiment, diphenyl carbonate may be used.

The biphenyl modified polycarbonate may be included in an amount of 5 to 95 wt %, and specifically 18 to 72 wt % based on the total weight of the composition. Within the ranges, impact resistance and scratch resistance are improved.

(B) Biphenyl or Terphenyl Modified (Meth)Acrylate-Based Copolymer

The (B) biphenyl or terphenyl modified (meth)acrylate-based copolymer includes (B-1) the repeating unit derived from aromatic (meth)acrylate having a refractive index of 1.58 to 1.70 and (B-2) the repeating unit derived from a mono-functional unsaturated monomer.

The (B-1) aromatic (meth)acrylate having a refractive index of 1.58 to 1.70 may include a biphenyl or terphenyl residual group. Specifically, the (B-1) aromatic (meth)acrylate having a refractive index of 1.58 to 1.70 may be represented by Chemical Formula 4:

[Chemical Formula 4]

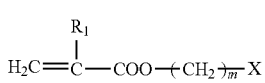

wherein, $R_1$ is hydrogen or a methyl group, m is an integer of 0 to 10, and X is an orthobiphenyl group, a metabiphenyl group, a parabiphenyl group, a 2,6-terphenyl group, an orthoterphenyl group, a metaterphenyl group or a paraterphenyl group.

Specific examples of the (B-1) aromatic (meth)acrylate having a refractive index of 1.58 to 1.70 may be orthobiphenyl methacrylate, metabiphenyl methacrylate, parabiphenyl methacrylate, 2,6-terphenyl methacrylate, orthoterphenyl methacrylate, metaterphenyl methacrylate, paraterphenyl methacrylate, 4-(4-methylphenyl)phenyl methacrylate, 4-(2-methylphenyl)phenylmethacrylate, 2-(4-methylphenyl)phenyl methacrylate, 2-(2-methylphenyl)phenyl methacrylate, 4-(4-ethylphenyl)phenyl methacrylate, 4-(2-ethylphenyl)phenyl methacrylate, 2-(4-ethylphenyl)phenyl methacrylate, 2-(2-ethylphenyl)phenyl methacrylate, and the like, but are not limited thereto. They may be used singularly or in a combination of two or more.

When preparing the (B) biphenyl or terphenyl modified (meth)acrylate-based copolymer, the (B-1) aromatic (meth)acrylate having a refractive index of 1.58 to 1.70 may be used in an amount of 1 to 50 wt %, specifically 5 to 45 wt %, and more specifically 10 to 42 wt %. The (B) modified (meth)acrylate-based copolymer prepared within the range may provide a resin composition with excellent property balance of heat resistance and transparency.

The (B-2) mono-functional unsaturated monomer may be selected from the group consisting of C1 to C8 alkyl(meth)acrylate such as methyl(meth)acrylate, ethyl(meth)acrylate, propyl(meth)acrylate, butyl(meth)acrylate, or 2-ethylhexyl (meth)acrylate; unsaturated carboxylic acid such as acrylic acid, or methacrylic acid; acid anhydride such as maleic anhydride; C1 to C8 hydroxy alkyl(meth)acrylate such as 2-hydroxyethyl(meth)acrylate, or 2-hydroxypropyl(meth)acrylate; (meth)acrylamide, N-alkyl(meth)acrylamide; a vinyl cyanide monomer such as acrylonitrile, or methacrylonitrile; allyl glycidyl ether; glycidyl(meth)acrylate; and an aromatic vinyl monomer such as styrene, or alphamethylstyrene.

C1 to C8 alkyl(meth)acrylate may be preferably used. Herein, much excellent scratch resistance and transparency may be accomplished. In an exemplary embodiment, a mixture of methacrylate and acrylate may be used. The methacrylate and the acrylate may be mixed in a weight ratio ranging from 6:1 to 100:1. Within the above range, excellent thermal stability and liquidity of a resin composition may be secured.

When preparing the (B) biphenyl or terphenyl modified acryl-based copolymer, the (B-2) mono-functional unsaturated monomer may be used in an amount of 50 to 99 wt %, specifically 55 to 95 wt %, and more specifically 58 to 90 wt %. When the (B-2) mono-functional unsaturated monomer is used within the range, property balance of scratch resistance, fluidity, transparency, and flame retardancy may be accomplished.

The (B) biphenyl or terphenyl modified (meth)acrylate-based copolymer may further include 0 to 49 wt % of (B-3) an alicyclic or aromatic (meth)acrylate having a refractive index of 1.490 to 1.579 as a monomer. The (B-3) alicyclic or aromatic (meth)acrylate may be represented by Chemical Formula 5 or Chemical Formula 6:

[Chemical Formula 5]

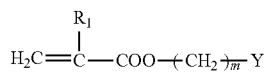

wherein, $R_1$ is hydrogen or a methyl group, m is an integer of 0 to 10, and Y is selected from a cyclohexyl group, a phenyl group, a methylphenyl group, a methylethylphenyl group, a methoxyphenyl group, a propylphenyl group, a cyclohexylphenyl group, a chlorophenyl group, a bromophenyl group, and a benzylphenyl group;

[Chemical Formula 6]

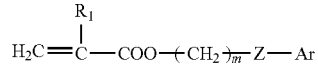

wherein, $R_1$ is hydrogen or a methyl group, m is an integer of 0 to 10, Z is oxygen (O) or sulfur (S), and Ar is selected from a cyclohexyl group, a phenyl group, a methylphenyl group, a methylethylphenyl group, a methoxyphenyl group, a cyclohexylphenyl group, a chlorophenyl group, a bromophenyl group, and a benzylphenyl group.

Examples of the aromatic or alicyclic methacrylate may be methacrylic acid such as cyclohexyl methacrylate, phenoxy methacrylate, 2-ethylphenoxy methacrylate, benzyl methacrylate, phenyl methacrylate, 2-ethylthiophenyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethylmethacrylate, 2-(4-(1-methylethyl)phenyl)ethylmethacrylate, 2-(4-methoxyphenyl)ethylmethacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, and 2-(4-benzylphenyl)ethyl methacrylate, but are not limited thereto. They may be used singularly or in a combination of two or more.

When preparing the (B) biphenyl or terphenyl modified (meth)acrylate-based copolymer, the (B-3) alicyclic or aromatic (meth)acrylate may be included in an amount of 0 to 49 wt % of the biphenyl or terphenyl modified (meth)acrylate-based copolymer. Preferably it may be included in an amount of 0 to 40 wt %. When the (B-3) alicyclic or aromatic (meth)acrylate is included within the range, much excellent property balance of transparency and heat resistance may be obtained.

The (B) biphenyl or terphenyl modified (meth)acrylate-based copolymer may be specifically prepared from polymerization (e.g., radical polymerization) of a monomer mixture including 1 to 50 wt % of the (B-1) aromatic (meth)acrylate having a refractive index of 1.58 to 1.70; 50 to 99 wt % of the (B-2) mono-functional unsaturated monomer; and 0 to 49 wt % of the (B-3) alicyclic or aromatic (meth)acrylate having a refractive index of 1.490 to 1.579. The polymerization condition and manner may be selected from known conditions/manners for a radical polymerization of (meth)acrylate-based monomers. For example, polymerization may be performed by bulk polymerization, emulsion polymerization or suspension polymerization. Preferably suspension polymerization may be used.

The (B) biphenyl or terphenyl modified (meth)acrylate-based copolymer may have a non-cross-linking structure and specifically, a linear structure. This (B) biphenyl or terphenyl modified (meth)acrylate-based copolymer having the non-cross-linking structure (or the linear structure) may be easily extruded or injection-molded and also has high compatibility with another resin such as polycarbonate. In addition, the (B) biphenyl or terphenyl modified (meth)acrylate-based copolymer may have a refractive index ranging from 1.495 to 1.640 and transmittance of greater than or equal to 85% when measured according to ASTM D1003. Furthermore, the (B) biphenyl or terphenyl modified (meth)acrylate-based copolymer has a glass transition temperature ranging from 90 to 140° C., specifically, 95 to 130° C.

The (B) biphenyl or terphenyl modified (meth)acrylate-based copolymer may have a weight average molecular weight of 3,000 to 150,000 g/mol, specifically 5,000 to 100,000 g/mol, and more specifically 10,000 to 50,000 g/mol. When the weight average molecular weight is within the range, compatibility and mechanical properties may be simultaneously maintained, and a molded article manufactured therefrom may have excellent transparency.

The (B) biphenyl or terphenyl modified (meth)acrylate-based copolymer may be included in an amount of 1 to 50 wt %, or specifically 5 to 40 wt % based on the total weight of the composition. When the (B) biphenyl or terphenyl modified (meth)acrylate-based copolymer is used within the weight range, excellent scratch resistance and impact resistance may be secured.

(C) Bisphenol A-Based Polycarbonate

The transparent polycarbonate composition may further include 90 wt % or less of (C) bisphenol A-based polycarbonate prepared by reaction of 2,2-bis-(4-hydroxyphenyl)-propane (bisphenol A) and a compound selected from phosgene, halogen formate, dialkyl carbonate, diaryl carbonate, and a combination thereof, as needed.

The (C) bisphenol A-based polycarbonate resin may have a weight average molecular weight of 10,000 to 50,000 g/mol, and specifically 15,000 to 40,000 g/mol, without limitation.

The (C) bisphenol A-based polycarbonate may be included in an amount of 0 to 90 wt %, and specifically 10 to 80 wt % based on the total weight of the composition.

In addition, the transparent polycarbonate composition may further include one or more additives other than the components if necessary to improve formability and to balance between each property or satisfy final purposes of the resin composition. Specifically, the additive may be a flame retardant, a surfactant, a nucleating agent, a coupling agent, filler, a plasticizer, an impact-reinforcing agent, a slip agent, an antibacterial agent, a release agent, a heat stabilizer, an antioxidant, a light stabilizer, an inorganic material additive, a colorant, a stabilizer, a lubricant, antistatic agent, pigment, dye, or a flame proofing agent and may be used singularly or in a combination of two or more. These additives may be appropriately included within a range unless it does harm on properties of the resin composition, specifically, in an amount of 20 parts by weight or less based on 100 parts by weight of the composition, without limitation.

Another embodiment of the present invention provides a molded product including the transparent polycarbonate composition. The molded product may be prepared by using the transparent polycarbonate composition in various methods such as injection molding, extrusion molding, blow molding, and the like, which are well known in a related art. The molded article may be prepared in form of a film.

The molded article simultaneously has high impact resistance and excellent scratch resistance and shows remarkably improved transparency. However, a transparent polycarbonate composition prepared according to a conventional art shows limited impact strength at predetermined pencil hardness. However, the molded article according to one embodiment of the present invention shows remarkably improved impact strength at predetermined pencil hardness and may overcome a limit of the conventional art. Specifically, the molded article may have pencil hardness of F to 2H measured according to JIS K 5401 and a scratch resistant width ranging from 295 to 230 μm when measured in a BSP evaluation method. In addition, the molded article may have a ⅛"-thick Izod impact strength ranging from 3 to 12 kgf·cm/cm when measured in an ASTM D256 evaluation method. On the other hand, the molded article may have haze ranging from 0.1 to 3.0% at a thickness of 2.5 mm when measured in an ASTM D1003 evaluation method.

Without being bound by any particular theory, the biphenyl modified polycarbonate may maintain excellent impact strength and mechanical properties of polycarbonate and remarkably improved scratch resistance, and the biphenyl or terphenyl modified (meth)acryl-based copolymer shows remarkably improved scratch resistance and have excellent compatibility with the polycarbonate and thus secure excellent transparency as well as high scratch resistance despite addition in a small amount and particularly, have excellent compatibility with the biphenyl modified polycarbonate. Accordingly, the above transparent polycarbonate composition including these according one embodiment of the present invention may show excellent transparency and simultaneously high impact strength and scratch resistance.

EXAMPLES

Hereinafter, the present invention is illustrated in more detail with reference to examples and comparative examples. However, the following examples and comparative examples are provided for the purpose of descriptions and the present invention is not limited thereto.

Examples 1 to 4

Each pellet resin composition was prepared by mixing each components provided in Table 1 in an amount shown in Table 1 and then, melting, kneading, and extruding the mixture. The extrusion was performed by using a twin-screw extruder having L/D=29 and a diameter of 45 mm and setting a barrel temperature at 220 to 240° C.

Comparative Examples 1 to 9

Each pellet-shaped resin composition was prepared according to the same method as Example 1 by using each components provided in Table 1 in an amount shown in Table 1.

TABLE 1

| wt % | Examples | | | | Comparative Examples | | | | | | | | |
|---|---|---|---|---|---|---|---|---|---|---|---|---|---|
| | 1 | 2 | 3 | 4 | 1 | 2 | 3 | 4 | 5 | 6 | 7 | 8 | 9 |
| (A) biphenyl modified polycarbonate | 20 | 20 | 40 | 70 | — | — | — | — | — | 50 | 100 | — | — |

TABLE 1-continued

| wt % | | Examples | | | | Comparative Examples | | | | | | | | |
|---|---|---|---|---|---|---|---|---|---|---|---|---|---|---|
| | | 1 | 2 | 3 | 4 | 1 | 2 | 3 | 4 | 5 | 6 | 7 | 8 | 9 |
| (B) biphenyl or terphenyl modified (meth)acryl-based copolymer | B-1 | 5 | — | 20 | 30 | 20 | 30 | 40 | — | — | — | — | — | — |
| | B-2 | — | 5 | — | — | — | — | — | — | — | — | — | — | — |
| (C) bisphenol A-based polycarbonate | | 75 | 75 | 40 | — | 80 | 70 | 60 | 80 | 80 | 50 | — | — | 100 |
| (D) acryl-based copolymer | D-1 | — | — | — | — | — | — | — | 20 | — | — | — | — | — |
| | D-2 | — | — | — | — | — | — | — | — | 20 | — | — | — | — |
| | D-3 | — | — | — | — | — | — | — | — | — | — | — | 100 | — |

(A) Biphenyl-modified polycarbonate: prepared by using a diol monomer mixture of 40 mol % of bisphenol-A, 10 mol % of 4,4'-biphenol, and 50 mol % of dimethylbisphenol-A and diphenylcarbonate in a conventional melting-polymerization method. Its weight average molecular weight was about 30,000 g/mol.

(B-1) A biphenyl or terphenyl modified (meth)acryl-based copolymer: prepared by using 20 wt % of orthobiphenyl methacrylate having a refractive index of about 1.64, 77.5 wt % of methyl methacrylate, and 2.5 wt % of methyl acrylate as a monomer in a conventional suspension polymerization method. The prepared copolymer had a refractive index of about 1.52 and a weight average molecular weight of about 35,000 g/mol.

(B-2) A biphenyl or terphenyl modified (meth)acryl-based copolymer: prepared by using 10 wt % of orthobiphenyl methacrylate having a refractive index of 1.64, 87.5 wt % of methyl methacrylate, and 2.5 wt % of methyl acrylate as a monomer in a conventional suspension polymerization method. The prepared copolymer had a refractive index of about 1.505 and a weight average molecular weight of about 20,000 g/mol.

(C) Bisphenol A-based linear polycarbonate: prepared by using bisphenol A and diphenyl carbonate in a conventional melting polymerization method. The prepared polycarbonate resin had a weight average molecular weight of about 25,000 g/ml.

(D-1) An acryl-based copolymer: prepared by using 40 wt % of phenyl methacrylate having a refractive index of 1.570, 57.5 wt % of methyl methacrylate, and 2.5 wt % of methyl acrylate as a monomer in a conventional suspension polymerization method. The prepared copolymer had refractive index of about 1.52 and a weight average molecular weight of about 50,000 g/mol.

(D-2) An acryl-based copolymer: prepared by using 97.5 wt % of methyl methacrylate and 2.5 wt % of methyl acrylate as a monomer in a conventional suspension polymerization method. The prepared copolymer had a refractive index of about 1.49 and a weight average molecular weight of about 50,000 g/mol.

(D-3) An acryl-based copolymer: prepared by using 97.5 wt % of methyl methacrylate and 2.5 wt % of methyl acrylate as a monomer in a conventional suspension polymerization method. The prepared copolymer had a refractive index of about 1.49 and a weight average molecular weight of about 100,000 g/mol.

Property Test

Each pellet according to Examples 1 to 4 and Comparative Examples 1 to 9 was dried at 80° C. for 6 hours and manufactured into an Izod Impact strength specimen having a size of L 90 mm×W 50 mm×T 2.5 mm according to an ASTM D256 standard by using a 6 Oz injection machine at a cylinder temperature of 240 to 250° C. and a molding temperature ranging from 55 to 60° C., and the transparency, haze, scratch resistance, pencil hardness, and impact strength of the specimen were measured as follows and provided in Table 2.

(1) Transparency: the specimen was examined with naked eyes and examined if transparent (◉) or opaque (×).

(2) Haze was measured at a thickness of 2.5 mm by using a haze meter of NDH 2000 made by Nippon Denshoku Industries Co., Ltd. according to an ASTM D1003 evaluation method. Herein, lower haze indicates more excellent transparency. (unit: %)

(3) Scratch resistance was measured according to a BSP (Ball-type Scratch Profile) evaluation method. A 10 to 20 mm-long scratch was made on the surface of the specimen having a size L 90 mm×W 50 mm×T 2.5 mm by using a spherically-shaped metal tip having a diameter of 0.7 mm under a load of 1000 g at a speed of 75 mm/min and then, surface-scanned with a metal stylus tip having a diameter of 2 μm by using a contact surface profile analyzer, XP-1 made by Ambios Technology Inc., and a scratch width (μm) was measured as a reference for scratch resistance. Herein, as the measured scratch width is small, scratch resistance is much excellent. (unit: μm)

(4) Pencil hardness: the pencil hardness of the specimen was measured according to a JIS K 5401 standard with a reference to 3B, 2B, B, HB, F, H, 2H, and 3H. A higher H value indicates higher scratch resistance performance, and a higher B value indicates lower scratch resistance performance.

(5) Impact strength: measured by making a notch in a ⅛"-thick Izod specimen according to a ASTM D256 standard. (unit: kgf·cm/cm)

TABLE 2

| Properties | Examples | | | | Comparative Examples | | | | | | | | |
|---|---|---|---|---|---|---|---|---|---|---|---|---|---|
| | 1 | 2 | 3 | 4 | 1 | 2 | 3 | 4 | 5 | 6 | 7 | 8 | 9 |
| Transparency | ◉ | ◉ | ◉ | ◉ | ◉ | ◉ | ◉ | ◉ | X | ◉ | ◉ | ◉ | ◉ |
| Haze | 1.4 | 1.3 | 1.4 | 1.3 | 1.4 | 1.5 | 1.5 | 1.7 | 92.4 | 1.4 | 1.4 | 1.1 | 1.3 |

TABLE 2-continued

| Properties | Examples | | | | Comparative Examples | | | | | | | | |
|---|---|---|---|---|---|---|---|---|---|---|---|---|---|
| | 1 | 2 | 3 | 4 | 1 | 2 | 3 | 4 | 5 | 6 | 7 | 8 | 9 |
| Scratch resistance (BSP) | 285 | 284 | 250 | 232 | 285 | 251 | 233 | 288 | 290 | 284 | 253 | 230 | 346 |
| pencil hardness | F | F | H | 2H | F | H | 2H | F | F | F | H | 2H | 2B |
| Impact strength (Izod) | 8.7 | 7.6 | 7.0 | 4.1 | 5.1 | 4.6 | 3.6 | 4.5 | 5.5 | 6.9 | 6.1 | 1.5 | 72 |

Referring to the result of Table 2, a specimen respectively formed of resin composition of Examples 1 to 4 had high scratch resistance and maintained, maintained high scratch resistance, and showed excellent transparency and haze. On the other hand, the specimens according to Comparative Examples 1 to 9 showed remarkably low Impact strength and/or insufficient transparency compared with specimens having similar pencil hardness according to Examples.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A transparent polycarbonate composition, comprising:
(A) 5 to 95 wt % of biphenyl modified polycarbonate including a repeating unit represented by Chemical Formula 1, a repeating unit represented by Chemical Formula 2, and a repeating unit represented by Chemical Formula 3:

[Chemical Formula 1]

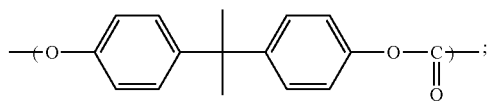

[Chemical Formula 2]

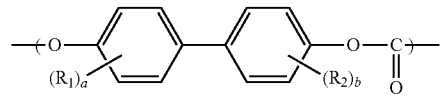

wherein, $R_1$ and $R_2$ are each independently a substituted or unsubstituted C1 to C6 alkyl group, and a and b are each independently an integer of 0 to 4;

[Chemical Formula 3]

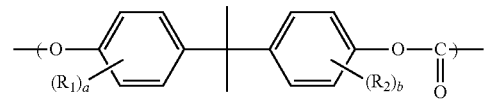

wherein, $R_1$ and $R_2$ are each independently a substituted or unsubstituted C1 to C6 alkyl group, and a and b are each independently an integer of 1 to 4; and
(B) 1 to 50 wt % of a biphenyl or terphenyl modified (meth)acrylate-based copolymer including (B-1) a repeating unit derived from aromatic (meth)acrylate having a refractive index of 1.58 to 1.70 and (B-2) a repeating unit derived from a mono-functional unsaturated monomer.

2. The transparent polycarbonate composition of claim 1, wherein in the (A) biphenyl modified polycarbonate, a ratio (M1:M2:M3) of the repeating unit represented by Chemical Formula 1 (M1), the repeating unit represented by Chemical Formula 2 (M2) and the repeating unit represented by Chemical Formula 3 (M3) is 10 to 85 mol %:5 to 30 mol %:10 to 80 mol %.

3. The transparent polycarbonate composition of claim 1, wherein the (A) biphenyl modified polycarbonate has a weight average molecular weight of 20,000 to 40,000 g/mol.

4. The transparent polycarbonate composition of claim 1, further comprising 90 wt % or less of (C) a bisphenol A-based polycarbonate prepared from reaction of 2,2-bis-(4-hydroxyphenyl)-propane (bisphenol A) and a compound selected from phosgene, halogen formate, dialkyl carbonate, diaryl carbonate, and a combination thereof.

5. The transparent polycarbonate composition of claim 4, wherein based on the sum of the (A) biphenyl modified polycarbonate and the (C) bisphenol A-based polycarbonate, the repeating unit represented by Chemical Formula 2 (M2) is present in a ratio of 5 to 30 mol %, and the repeating unit represented by Chemical Formula 3 (M3) is present in a ratio of 10 to 80 mol %.

6. The transparent polycarbonate composition of claim 1, wherein the (B-1) aromatic (meth)acrylate having a refractive index of 1.58 to 1.70 is represented by Chemical Formula 4:

[Chemical Formula 4]

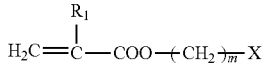

wherein, $R_1$ is hydrogen or a methyl group, m is an integer of 0 to 10, and X is an orthobiphenyl group, a metabiphenyl group, a parabiphenyl group, a 2,6-terphenyl group, an orthoterphenyl group, a metaterphenyl group or a paraterphenyl group.

7. The transparent polycarbonate composition of claim 1, wherein the (B) biphenyl or terphenyl modified (meth)acrylate-based copolymer is a copolymer of 1 to 50 wt % of the (B-1) aromatic (meth)acrylate having a refractive index of 1.58 to 1.70; and 50 to 99 wt % of the (B-2) mono-functional unsaturated monomer.

8. The transparent polycarbonate composition of claim 7, wherein the (B) biphenyl or terphenyl modified (meth)acrylate-based copolymer is a copolymer of a mixture that further includes 0 to 49 wt % of (B-3) an alicyclic or aromatic (meth)acrylate having a refractive index of 1.490 to 1.579 and represented by Chemical Formula 5 or Chemical Formula 6:

[Chemical Formula 5]

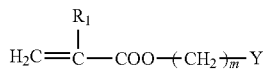

wherein, $R_1$ is hydrogen or a methyl group, m is an integer of 0 to 10, and Y is selected from a cyclohexyl group, a phenyl group, a methylphenyl group, a methylethylphenyl group, a methoxyphenyl group, a propylphenyl group, a cyclohexylphenyl group, a chlorophenyl group, a bromophenyl group, and a benzylphenyl group;

[Chemical Formula 6]

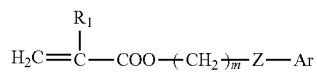

wherein, $R_1$ is hydrogen or a methyl group, m is an integer of 0 to 10, Z is oxygen (O) or sulfur (S), and Ar is selected from a cyclohexyl group, a phenyl group, a methylphenyl group, a methylethylphenyl group, a methoxyphenyl group, a cyclohexylphenyl group, a chlorophenyl group, a bromophenyl group, and a benzylphenyl group.

9. The transparent polycarbonate composition of claim 7, wherein the (B-2) mono-functional unsaturated monomer comprises at least one selected from the group consisting of C1 to C8 alkyl (meth)acrylate; unsaturated carboxylic acid; acid anhydride; C1 to C8 hydroxy alkyl (meth)acrylate; N-alkyl(meth)acrylamide; (meth)acrylamide; a vinyl cyanide monomer; allyl glycidyl ether; glycidyl (meth)acrylate; and an aromatic vinyl monomer.

10. The transparent polycarbonate composition of claim 1, wherein the (B) biphenyl or terphenyl modified (meth)acrylate-based copolymer has a weight average molecular weight of 3,000 to 150,000 g/mol.

11. The transparent polycarbonate composition of claim 1, wherein the (B) biphenyl or terphenyl modified (meth)acrylate-based copolymer has a refractive index of 1.495 to 1.640.

12. A molded article comprising the transparent polycarbonate composition of claim 1.

13. The molded article of claim 12, having a pencil hardness of F to 2H when measured according to a JIS K 5401 evaluation method and a scratch-resistant width ranging from 295 to 230 μm when measured in a BSP evaluation method.

14. The molded article of claim 12, having a ⅛"-thick Izod impact strength ranging from 3 to 12 kgf·cm/cm when measured in an ASTM D256 evaluation method.

15. The molded article of claim 12, having a haze ranging from 0.1 to 3.0% when measured in an ASTM D1003 evaluation method.

* * * * *